Nov. 17, 1959    R. C. BINNING ET AL    2,913,507
HYDROCARBON CONVERSION WITH DIALYTIC SEPARATION OF
THE CATALYST FROM THE HYDROCARBON PRODUCTS
Filed Oct. 15, 1957
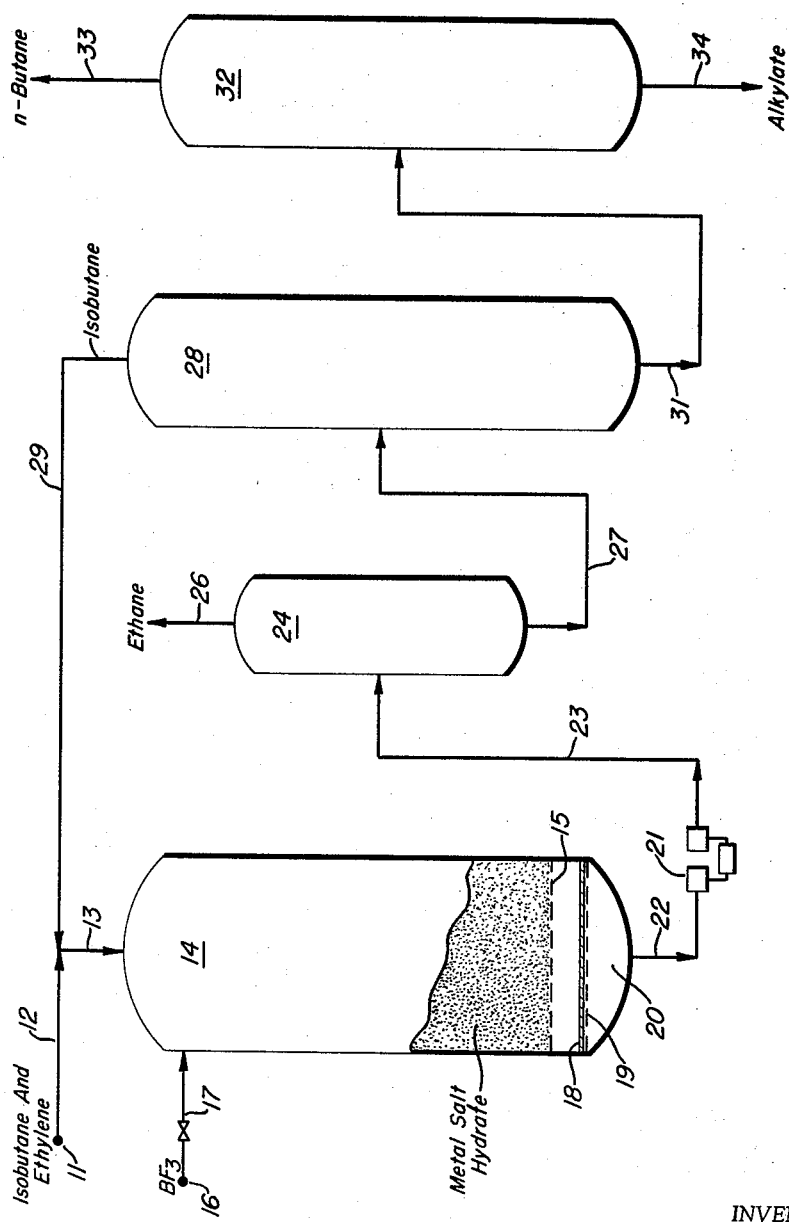
INVENTORS:
Robert C. Binning
Joe T. Kelly
BY
Joseph C. Kotarski
ATTORNEY

United States Patent Office 2,913,507
Patented Nov. 17, 1959

2,913,507

HYDROCARBON CONVERSION WITH DIALYTIC SEPARATION OF THE CATALYST FROM THE HYDROCARBON PRODUCTS

Robert C. Binning, Texas City, and Joe T. Kelly, Dickinson, Tex., assignors to The American Oil Company, Texas City, Tex., a corporation of Texas Application October 15, 1957, Serial No. 690,309

6 Claims. (Cl. 260—683.44)

This invention relates to methods for separating catalytic materials from organic chemicals and to improved methods for carrying out catalytic reactions which employ such methods for separating catalytic materials from organic chemicals.

An object of the present invention is to provide a method for separating dissolved acidic catalytic materials from liquid oil soluble organic chemicals. Another object is to provide a method for carrying out chemical reactions involving oil soluble organic chemicals which method minimizes or eliminates the need for the customary ancillary equipment ordinarily needed to separate catalyst from the reaction products. A further object is to provide a method for carrying out chemical reactions whereby the reaction products are withdrawn from the reaction zone while retaining the catalyst in the reaction zone. Other objects and advantages of the invention would be apparent from the detailed description thereof.

In accordance with the present invention, oil soluble organic chemical reactants are contacted with an acidic catalyst material in a reaction zone. The chemical reaction is carried out in the reaction zone while maintaining a liquid phase of oil soluble organic chemicals therein. This liquid phase, which contains dissolved catalyst, is contacted with one side of a permeation membrane. The permeation membrane functions as a portion of the boundary of the reaction zone. Liquid is permeated through the membrane and withdrawn from the opposite side of the membrane usually into a zone of lower pressure than exists in the reaction zone. The permeated mixture is rapidly removed from contact with the membrane and the reaction products of the oil soluble chemicals is recovered therefrom. Because the permeation membrane, which is a non-porous plastic membrane such as polyethylene, polyvinyl chloride, polyvinyl butyral, copolymer of vinyl chloride-vinylidene acrylonitrile, etc., permeates the oil soluble organic chemicals without permeating in any substantial amount the catalyst dissolved in such chemicals, the catalyst is retained within the reaction zone while the organic chemicals are removed therefrom. It is thus possible to continuously introduce the chemical reactants such as hydrocarbons, including olefins with isoparaffins, olefins with aromatics or phenols, olefins such as propylene, etc., into the reaction zone, and at the same time continuously permeate the reaction products (plus some unconverted reactants if present therein) from the reaction zone while retaining substantially all of the catalyst in the reaction zone. In this manner, various chemical reactions such as alkylation, dehydroalkylation, polymerization, esterification, etc., can be carried out. The present invention also provides in a broad sense, a method for separating dissolved acidic catalytic materials from liquid oil soluble organic chemicals by contacting the liquid chemical containing the dissolved catalyst with the permeation membrane under permeation conditions, and removing from the opposite side of the membrane a permeated mixture of oil soluble organic chemicals containing a lower concentration of the dissolved acidic catalytic material than is present in the feed solution to the permeation step.

Attached Figure 1, which forms a portion of this specification shows in schematic form an embodiment of the present invention in which isobutane is alkylated with ethylene and a permeation membrane forming a portion of the reaction zone boundary is employed to permeate hydrocarbon alkylate while retaining catalyst within the reaction zone.

Ethylene and isobutane from source 11 are passed by way of line 12 into line 13. The ethylene and isobutane are substantially pure, but they do contain minor amount of ethane and n-butane as impurities. The ethylene and isobutane, which have been freed of water and have been well mixed, compressed and liquified by means not shown, are passed at a temperature of about 30° C. and a pressure of about 600 p.s.i.g. into reactor 14. The isobutane/ethylene ratio is about 6:1. The alkylation reactor 14 contains a metal salt hydrate-$BF_3$ complex, specifically ferric pyrophosphate containing 6 mols of $H_2O$ of hydration and about 6 mols of $BF_3$ per mol of ferric pyrophosphate. The ferric pyrophosphate hydrate-$BF_3$ complex, which is a solid, is supported within the reaction zone by grid 15. Uncomplexed $BF_3$ is introduced from source 16 by way of valved line 17, into alkylation reactor 14 in an amount equal approximately to 1.5 parts by weight of $BF_3$ for part of olefin in reactor 14. This excess uncomplexed $BF_3$ is essentially all dissolved in the liquid hydrocarbons contained in reactor 14. A reaction temperature of about 35° C. is maintained (heat of reaction being removed by heat exchange means not shown herein) in reactor 14.

As the reactants (which are in the liquid phase) pass downwardly through reactor 14, isobutane becomes alkylated with ethylene to form alkylation reaction products which are primarily diisopropyl. As the alkylation reaction products approach the bottom of reactor 14, they come in contact with permeation membrane 18 which defines the bottom of the reaction zone. This permeation membrane is a film of polyethylene of 1 mil thickness which has been subjected to irradiation at a dosage level of 50 megaroentgens per sq. cm. of polyethylene surface. The permeation membrane is supported by a porous plate member or screen 19 which prevents the membrane from bulging downwardly due to the pressure within the reaction zone. On the side of the permeation membrane opposite the reaction zone side of the membrane is the permeate zone 20. This zone is maintained at a reduced pressure, i.e., a pressure which is lower than exists in the reaction zone. In this embodiment the reduced pressure maintained within the premeate zone 20 is sufficiently low to cause vaporization of the permeating hydrocarbons. The pressure maintained within permeate zone is approximately 50 mm. Hg abs., which is produced by the suction side of a compressor 21 in line 22. The very low pressure which exists in permeate zone 20 causes the mixture of hydrocarbons to flash into vapors as they pass from the reaction zone through the membrane and into the permeate zone. The flashing removes heat from the liquids in the reaction zone which are in contact with the permeation membrane, thus tending to maintain the desired low reaction temperature in the reaction zone which is important in obtaining high yields of high octane alkylate.

The vapors in permeate zone 20 consist of ethane, butanes, diisopropyl and other alkylation products. The permeated hydrocarbons contain only about 0.1% by weight of $BF_3$ as compared with a concentration of about 3% by weight of $BF_3$ in the hydrocarbons in the reaction zone.

The hydrocarbon vapors containing the trace of $BF_3$ are rapidly removed from permeate zone 20 and passed by way of line 22 through compressor 21 into line 23 and then into ethane separator 24. If desired, the trace amount of $BF_3$ can be removed from the hydrocarbons by washing with caustic solution followed by water washing, preferably after the hydrocarbons have been compressed. In ethane separator 24 the small amounts of ethane, which may or may not contain trace amounts of $BF_3$, are removed overhead by way of line 26. Because ethane and $BF_3$ have similar volatilities, they cannot effectively be separated by fractionation techniques. Therefore the permeation technique employed in this invention enables, in a sense, the recovery of $BF_3$ by a relatively simple expedient whereas $BF_3$ could not be recovered easily from ethane by conventional techniques.

The bottoms stream from ethane separator 24, which may be a typical stabilizer, is passed by way of line 27 into deisobutanizer tower 28. In this fractionator the isobutane is removed overhead and passed by way of line 29, through compressor and condenser means (not shown herein) by which is the isobutane is liquefied, and returned to line 13 by which it is recycled to alkylation reactor 14. A bottoms stream is removed from deisobutanizer 28 and passed by way of line 31 to debutanizer 32. In this fractionator the n-butane is removed overhead and passed by way of line 33 to storage means not shown. The bottoms stream from debutanizer 32, which is removed by way of line 34, consists of gasoline boiling range alkylate of high octane number. It is a highly desired blending stock for making premium gasolines.

It is obvious that the present invention has applicability where other reactions are carried out involving oil soluble organic chemicals. For instance, aromatic hydrocarbons or phenols may be alkylated with olefins, propylene or butylene, etc., may be polymerized to higher molecular weight liquids, normal paraffins such as n-pentane or n-hexane may be isomerized to their branched chain isomers, aromatics may be dehydroalkylated with isoparaffins, carboxylic acids may be esterified with alcohols, esters of carboxylic acids may be hydrolyzed to produce acids and alcohols, etc. Not only may $BF_3$ be used in the alkylation and other reactions such as are set out above, but other Friedel-Crafts metal halides may be employed as the acidic catalytic materials used in causing the reaction to proceed. For example $AlCl_3$, $AlBr_3$, liquid complexes formed between $AlCl_3$ or $AlBr_3$ and hydrocarbons or the like, $FeCl_3$, $SnCl_4$, $SbCl_3$, or other Friedel-Crafts catalysts may be employed. Acidic catalytic materials such as the strong mineral acids e.g. $H_2SO_4$, $HCl$, $H_3PO_4$, $HF$; aromatic sulfonic acids, alkane sulfonic acids, trifluoroacetic acid, etc., may be used.

It is important when carrying out the chemical reaction that a liquid phase of the oil soluble organic chemicals in the reaction zone be in contact with the permeation membrane. If only the vapors present in the reaction zone are in contact with the membrane, then the permeation of the oil soluble organic chemicals does not function in the desired manner; and with certain catalytic materials such as $BF_3$ it has been found that the permeation membrane ruptures rapidly and thus upsets the entire process. In order for permeation to proceed, the concentration of the permeated chemicals must be lower in the permeate zone than in the reaction zone. Therefore the permeated chemicals should be rapidly removed from the permeate zone inasmuch as the continuance of permeation depends upon maintaining non-equilibrium conditions on the opposite sides of the membrane. A convenient way consists in maintaining conditions of temperature and pressure in the permeate zone such that the organic chemicals permeating through the membrane are vaporized in the permeate zone and the vapors rapidly withdrawn therefrom. Thus the pressure in the permeate zone will be lower than in the feed or reaction zone, and the permeate zone may suitably be maintained at a sub-atmospheric pressure. The temperature at which the permeation is carried out will depend greatly upon the temperature within the reaction zone. Obviously the permeation must be carried out at a temperature below that at which the membrane will soften to the point of rupturing, and therefore the temperatures used in the reaction zone will be limited by this factor. Suitable temperatures are from −25° C. to 250° C. Permeation membranes composed of various materials such as polyethylene, irradiated polyethylene, polymers of trifluorochloroethylene, hydrogenated polybutadiene, polyvinyl butyral, polyvinyl chloride, copolymers of vinyl chloride with vinylidene chloride and acrylonitrile, and similar hydrophobic flexible plastic materials may be used. The permeation membrane will ordinarily be from 0.1 to 10 mils in thickness, the thinner the membrane the faster the permeation rate.

While the invention has been described with respect to a particularly advantageous and unique embodiment, it also encompasses the separation of oil soluble organic chemicals (such as would be used or produced in chemical reactions of the type listed as well as others) from acidic catalytic materials (of the type described previously) which are soluble in the organic chemicals. Thus the separation may be effected entirely apart from the reaction zone. For example, a liquid mixture of hydrocarbons containing the dissolved catalytic material, such as $H_2SO_4$, $AlCl_3$ etc., may be contacted while in the liquid state with one side of a permeation membrane. In its simplest form, the permeation membrane may consist of a vessel which is separated into two chambers by the non-porous plastic permeation membrane such as polyethylene. A reduced pressure sufficient to vaporize the hydrocarbons under the permeation temperature employed is maintained in the permeate zone. A permeated mixture of hydrocarbons having a lower concentration of the acidic catalytic material is removed from the permeate zone. The non-permeated mixture is enriched in the acidic catalytic material. The permeated and nonpermeated fractions may be further processed in subsequent permeation stages if desired.

Thus having described the invention, what is claimed is:

1. A method for effecting catalytic reactions in which catalyst is retained in the reaction zone while reaction products are removed therefrom which method comprises contacting hydrocarbon reactants with a catalyst comprising boron trifluoride in a reaction zone under superatmospheric pressure, maintaining a phase of liquid hydrocarbons containing dissolved boron trifluoride in said reaction zone, contacting said liquid phase with one side of a hydrophobic plastic permeation membrane and permeating liquid hydrocarbons through said membrane and out of said reaction zone into a zone of reduced pressure, rapidly removing from the opposite side of said membrane a permeated mixture of hydrocarbons and boron trifluoride which permeated mixture contains a lower concentration of boron trifluoride than is present in the mixture in said reaction zone, and recovering hydrocarbon reaction products from said permeated mixture.

2. A method for producing gasoline boiling range alkylate which comprises contacting in a reaction zone an isoparaffin and an olefin with a catalyst comprising boron trifluoride and ferric pyrophosphate containing water of hydration at a temperature between about −25° C. and 150° C. under a pressure of about 100 to 1000 p.s.i.g., maintaining a phase of liquid hydrocarbons containing dissolved boron trifluoride in said reaction zone, contacting said liquid phase with one side of a permeation membrane and hydrophobic plastic permeating liquid hydrocarbons through said membrane and out of said reaction zone into a zone of reduced pressure from which the permeated mixture is rapidly removed, said permeated mixture comprising hydrocarbons and boron trifluoride in which the boron trifluoride is present in a lower concentration than in said reaction zone, and recovering a gasoline boiling range alkylate from said permeated mixture.

3. The method of claim 2 wherein the hydrophobic plastic permeation membrane is polyethylene.

4. A method for effecting catalytic reactions in which catalyst is retained in the reaction zone while reaction products are removed therefrom which method comprises contacting oil soluble organic chemical reactants with an acidic catalyst material in a reaction zone, maintaining a phase of liquid oil soluble organic chemicals containing dissolved catalyst in said reaction zone, contacting said liquid phase with one side of a hydrophobic plastic permeation membrane and permeating liquid oil soluble organic chemicals from said reaction zone through said membrane into a permeate zone, rapidly removing from the permeate zone a permeated mixture of oil soluble organic chemicals and acidic catalyst which permeated mixture contains a lower concentration of acidic catalyst than is present in the mixture in said reaction zone, and recovering oil soluble organic chemical reaction products from said permeated mixture.

5. The method of claim 4 wherein the reactants are continuously introduced into the reaction zone and a permeated mixture is continuously removed from the reaction zone.

6. A method for removing acidic catalytic materials which are dissolved in an oil soluble organic chemical which comprises contacting a feed liquid solution of oil soluble organic chemical containing dissolved acidic catalytic material with one side of a hydrophobic plastic permeation membrane under permeation conditions, permeating said feed liquid solution through said membrane, and removing from the opposite side of said membrane a permeated mixture of oil soluble organic chemicals containing a lower concentration of dissolved acidic catalytic material than is present in the feed solution.

References Cited in the file of this patent

UNITED STATES PATENTS

| | | |
|---|---|---|
| 2,349,053 | Pevere | May 16, 1944 |
| 2,386,826 | Wallach et al. | Oct. 16, 1945 |
| 2,475,990 | Robertson | July 12, 1949 |
| 2,824,146 | Kelly | Feb. 18, 1958 |
| 2,849,443 | Steinmann | Aug. 26, 1958 |

FOREIGN PATENTS

| | | |
|---|---|---|
| 182,246 | Germany | June 22, 1906 |
| 224,252 | Great Britain | Aug. 27, 1925 |
| 592,587 | Great Britain | Sept. 23, 1947 |
| 660,017 | Great Britain | Oct. 31, 1947 |

OTHER REFERENCES

Barrer: Chemistry Society, "Quarterly Reviews," vol. III, 1949, pages 314–320.

UNITED STATES PATENT OFFICE
CERTIFICATE OF CORRECTION

November 17, 1959

Patent No. 2,913,507

Robert C. Binning et al.

It is hereby certified that error appears in the printed specification of the above numbered patent requiring correction and that the said Letters Patent should read as corrected below.

Column 3, line 21, after "which" strike out -- is --; column 4, line 67, before "permeation" insert -- hydrophobic plastic --; line 68, before "permeating" strike out "hydrophobic plastic".

Signed and sealed this 10th day of May 1960.

(SEAL)
Attest:

KARL H. AXLINE
Attesting Officer

ROBERT C. WATSON
Commissioner of Patents